United States Patent
Lu et al.

(10) Patent No.: US 12,487,752 B2
(45) Date of Patent: Dec. 2, 2025

(54) MULTI-STAGE ERASE OPERATION OF MEMORY CELLS IN A MEMORY SUB-SYSTEM

(71) Applicant: Micron Technology, Inc., Boise, ID (US)

(72) Inventors: Ching-Huang Lu, Fremont, CA (US); Yingda Dong, Los Altos, CA (US); Sampath K. Ratnam, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 55 days.

(21) Appl. No.: 18/082,803

(22) Filed: Dec. 16, 2022

(65) Prior Publication Data

US 2023/0195328 A1 Jun. 22, 2023

Related U.S. Application Data

(60) Provisional application No. 63/292,835, filed on Dec. 22, 2021.

(51) Int. Cl.
*G06F 12/00* (2006.01)
*G06F 3/06* (2006.01)

(52) U.S. Cl.
CPC .......... *G06F 3/0619* (2013.01); *G06F 3/0652* (2013.01); *G06F 3/0679* (2013.01)

(58) Field of Classification Search
CPC ..... G06F 3/0619; G06F 3/0652; G06F 3/0679
USPC ........................................................ 711/103
See application file for complete search history.

(56) References Cited

U.S. PATENT DOCUMENTS

| | | | | |
|---|---|---|---|---|
| 9,058,865 | B1* | 6/2015 | Jo | G11C 13/0002 |
| 9,230,676 | B1* | 1/2016 | Pang | G11C 16/26 |
| 9,299,450 | B1* | 3/2016 | Pang | G11C 16/0483 |
| 10,665,303 | B1* | 5/2020 | Lee | G11C 16/0483 |
| 11,133,074 | B1* | 9/2021 | Li | G11C 16/3472 |
| 11,289,170 | B2* | 3/2022 | Song | H01L 25/0657 |
| 2003/0076710 | A1* | 4/2003 | Sofer | G11C 16/3445 |
| | | | | 365/185.22 |
| 2006/0071265 | A1* | 4/2006 | Koh | H10B 69/00 |
| | | | | 438/266 |
| 2009/0290423 | A1* | 11/2009 | Kim | G11C 16/344 |
| | | | | 365/185.29 |
| 2010/0046302 | A1* | 2/2010 | Ogura | G11C 11/5642 |
| | | | | 365/207 |
| 2012/0254515 | A1* | 10/2012 | Melik-Martirosian | |
| | | | | G06F 12/0246 |
| | | | | 711/E12.008 |

(Continued)

*Primary Examiner* — Mohamed M Gebril
(74) *Attorney, Agent, or Firm* — LOWENSTEIN SANDLER LLP

(57) ABSTRACT

Control logic in a memory device executes a programming operation to program a memory cell of a set of memory cells to a programming level. A first erase sub-operation is executed to erase the memory cell to a first threshold voltage level, the first erase sub-operation including applying, to the memory cell, a first erase pulse having a first erase voltage level. A second erase sub-operation is executed to erase the memory cell to a second threshold voltage level, the second erase sub-operation including applying, to the memory cell, a second erase pulse having a second erase voltage level, where the first erase voltage level of the first erase pulse is lower than the second erase voltage level of the second erase pulse.

19 Claims, 11 Drawing Sheets

(56) References Cited

U.S. PATENT DOCUMENTS

| | | | | |
|---|---|---|---|---|
| 2014/0108705 | A1* | 4/2014 | Gorobets | G11C 11/5628 |
| | | | | 711/103 |
| 2016/0049192 | A1* | 2/2016 | Lee | G11C 7/18 |
| | | | | 365/185.03 |
| 2016/0141041 | A1* | 5/2016 | Yang | G11C 11/5635 |
| | | | | 365/185.11 |
| 2016/0172045 | A1* | 6/2016 | Shukla | G11C 16/0483 |
| | | | | 365/185.11 |
| 2016/0180926 | A1* | 6/2016 | Young | G11C 11/5628 |
| | | | | 365/185.11 |
| 2019/0378574 | A1* | 12/2019 | Lee | G11C 11/5635 |
| 2020/0035295 | A1* | 1/2020 | Khan | H10D 64/691 |
| 2020/0142637 | A1* | 5/2020 | Park | G11C 16/3495 |
| 2022/0093179 | A1* | 3/2022 | Lee | G11C 16/30 |
| 2022/0165341 | A1* | 5/2022 | Pitner | G11C 16/14 |
| 2022/0199174 | A1* | 6/2022 | Song | H01L 25/18 |
| 2022/0336029 | A1* | 10/2022 | Zhao | G11C 16/3477 |
| 2023/0004291 | A1* | 1/2023 | Kim | G06F 12/0253 |
| 2023/0154541 | A1* | 5/2023 | Yuan | G11C 7/1048 |
| | | | | 365/185.29 |
| 2023/0154543 | A1* | 5/2023 | Huang | G11C 16/0433 |
| | | | | 365/185.17 |
| 2023/0195328 | A1* | 6/2023 | Lu | G06F 3/0679 |
| | | | | 711/103 |
| 2023/0402098 | A1* | 12/2023 | Or-Bach | H10B 43/10 |
| 2024/0046996 | A1* | 2/2024 | Song | G11C 16/0483 |
| 2024/0069730 | A1* | 2/2024 | Yamparala | G06F 3/0604 |

* cited by examiner

┌─────────────────────────────────────────────────────┐
│ Execute a programming operation to program a memory │
│      cell of a memory device to a programming level │
│                         710                         │
└─────────────────────────────────────────────────────┘
                            │
                            ▼
┌─────────────────────────────────────────────────────┐
│ Execute a first erase sub-operation to erase the    │
│ memory cell to a first threshold voltage level, the │
│ first erase sub-operation including applying, to    │
│ the memory cell, a first erase pulse having a first │
│ erase voltage level                                 │
│                         720                         │
└─────────────────────────────────────────────────────┘
                            │
                            ▼
┌─────────────────────────────────────────────────────┐
│ Execute a second erase sub-operation to erase the   │
│ memory cell to a second threshold voltage level,    │
│ the second erase sub-operation including applying,  │
│ to the memory cell, a second erase pulse having a   │
│ second erase voltage level                          │
│                         730                         │
└─────────────────────────────────────────────────────┘
```

FIG. 7

MULTI-STAGE ERASE OPERATION OF MEMORY CELLS IN A MEMORY SUB-SYSTEM

CROSS-REFERENCE TO RELATED APPLICATION

This application claims the benefit of U.S. Provisional Application No. 63/292,835, titled "Multi-stage Erase Operation of Memory Cells in a Memory Sub-System," filed Dec. 22, 2021, the entire disclosure of which is incorporated herein by reference.

TECHNICAL FIELD

Embodiments of the disclosure relate generally to memory sub-systems, and more specifically, relate to a multi-stage erase operation of memory cells in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

FIG. 3 is a block schematic of a portion of an array of memory cells as could be used in a memory of the type described with reference to FIG. 1B according to an embodiment.

FIG. 7 is a flow diagram of an example method of a programming-erase cycle including a multi-stage erase operation to erase a memory cell of a memory device in a memory sub-system in accordance with some embodiments of the present disclosure.

DETAILED DESCRIPTION

Figure 1A:
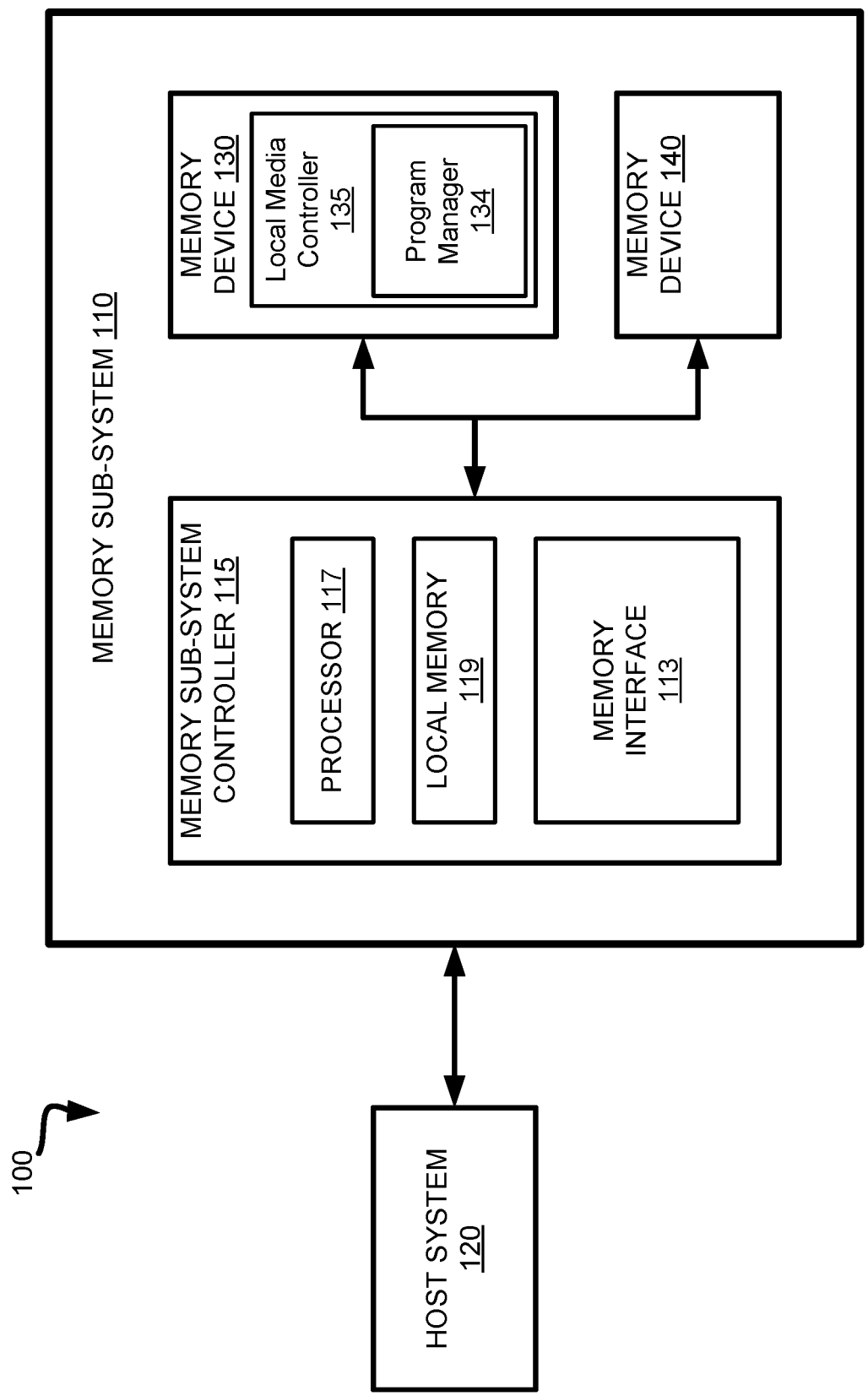
FIG. 1A illustrates an example computing system that includes a memory sub-system in accordance with some embodiments.

Aspects of the present disclosure are directed to programming of a memory device in a memory sub-system using a push-pull or soft erase operation. A memory sub-system can be a storage device, a memory module, or a hybrid of a storage device and memory module. Examples of storage devices and memory modules are described below in conjunction with FIG. 1A. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a not-and (NAND) memory device. Other examples of non-volatile memory devices are described below in conjunction with FIG. 1A. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

Memory cells are formed onto a silicon wafer in an array of columns connected by conductive lines (also referred to as bitlines) and rows connected by conductive lines (also referred to as wordlines). A wordline can refer to a conductive line that connects control gates of a set (e.g., a row) of memory cells of a memory device that are used with one or more bitlines to generate the address of each of the memory cells. The intersection of a bitline and wordline constitutes the address of the memory cell.

A block hereinafter refers to a unit of the memory device used to store data and can include a group of memory cells, a wordline group, a wordline, or individual memory cells. Each block can include a number of sub-blocks, where each sub-block is defined by an associated pillar (e.g., a vertical conductive trace) extending from a shared bitline. Memory pages (also referred to herein as "pages") store one or more bits of binary data corresponding to data received from the host system. To achieve high density, a string of memory cells in a non-volatile memory device can be constructed to include a number of memory cells at least partially surrounding a pillar of poly-silicon channel material (i.e., a channel region). The memory cells can be coupled to access lines (i.e., wordlines) often fabricated in common with the memory cells, so as to form an array of strings in a block of memory (e.g., a memory array). The compact nature of certain non-volatile memory devices, such as 3D flash NAND memory, means wordlines are common to many memory cells within a block of memory. Some memory devices use certain types of memory cells, such as triple-level cell (TLC) memory cells, which store three bits of data in each memory cell, which make it affordable to move more applications from legacy hard disk drives to newer memory sub-systems, such as NAND solid-state drives (SSDs).

Memory access operations (e.g., a program operation, an erase operation, etc.) can be executed with respect to the memory cells by applying a wordline bias voltage to wordlines to which memory cells of a selected page are connected. For example, during a programming operation, one or more selected memory cells can be programmed with the application of a programming voltage to a selected wordline. In one approach, an Incremental Step Pulse Programming (ISPP) process or scheme can be employed to maintain a tight cell threshold voltage distribution for higher data reliability. In ISPP, a series of high-amplitude pulses of voltage levels having an increasing magnitude (e.g., where the magnitude of subsequent pulses are increased by a predefined pulse step height) are applied to wordlines to which one or more memory cells are connected to gradually raise the voltage level of the memory cells to above a wordline voltage level corresponding to the memory access operation (e.g., a target program level). The application of the uniformly increasing pulses by a wordline driver of the memory device enables the selected wordline to be ramped or increased to a wordline voltage level ($V_{wl}$) corresponding to a memory access operation. Similarly, a series of voltage pulses having a uniformly increasing voltage level can be applied to the wordline to ramp the wordline to the corresponding wordline voltage level during the execution of an erase operation.

The series of incrementing voltage programming pulses are applied to the selected wordline to increase a charge level, and thereby a threshold voltage (Vt), of each memory cell connected to that wordline. After each programming pulse, or after a number of programming pulses, a program verify operation is performed to determine if the threshold voltage of the one or more memory cells has increased to a desired programming level (e.g., a stored target threshold voltage corresponding to a programming level). A program verify operation can include storing a target threshold voltage in a page buffer that is coupled to each data line (e.g., bitline) and applying a ramped voltage to the control gate of the memory cell being verified. When the ramped voltage reaches the threshold voltage to which the memory cell has been programmed, the memory cell turns on and sense circuitry detects a current on a bit line coupled to the memory cell. The detected current activates the sense circuitry to compare if the present threshold voltage is greater than or equal to the stored target threshold voltage. If the present threshold voltage is greater than or equal to the target threshold voltage, further programming is inhibited.

During programming, the sequence of programming pulses can be incrementally increased in value (e.g., by a step voltage value such as 0.33V) to increase a charge stored on a charge storage structure corresponding to each pulse. The memory device can reach a target programming level voltage for a particular programming level by incrementally storing or increasing amounts of charge corresponding to the programming step voltage.

According to this approach, the series of programming pulses and program verify operations are applied to program each programming level (e.g., programming levels L1 to L7 for a TLC memory cell) in sequence. For example, this approach sequentially programs the levels of the memory cell (e.g., L1 to L7) by applying a first set of pulses to program level L1 to a first target voltage level, followed by the application of a second set of pulses to program level L2 to a second target voltage level, and so on until all of the levels are programmed.

Immediately after programming, the data-storage node (e.g., a floating gate, charge trap, and the like) can experience multiple forms of charge loss including single bit charge loss, intrinsic charge loss, and quick charge loss. Single bit charge loss is the result of a defective memory cell that exhibits electron leakage. This leakage can be accelerated with voltage or high temperature stress and results in inferior data retention. Intrinsic charge loss is an immediate leakage of electrons from the storage node, closest to the tunnel oxide, after a programming pulse. The trapped charge initially causes the memory cell Vt to appear higher than the level to which the storage node is programmed. The leakage of these electrons after programming then causes a one time shift in the threshold voltage. Quick charge loss also causes an immediate Vt shift after a programming pulse. Quick charge loss is the result of electrons trapped in the tunnel oxide layer after the programming pulse moving back into the channel region. When a cell passes the verify operation, the programmed threshold voltage appears to be higher due to the trapped charge in the tunnel oxide. When the memory cell is read after the program operation has been completed, the cell has a Vt that is lower than the Vt obtained during the program verify operation due to the charge in the tunnel oxide leaking out to the channel region. Accordingly, due to charge loss, a memory cell that was initially identified as passing the verify operation can have a reduction of the corresponding Vt such that, subsequently, the memory cell no longer passes the verify operation.

Disadvantageously, shallow trap electrons are lost slowly after program completion. This causes the programming distribution to widen from the target distribution. Since this loss occurs slowly, after program completion, the memory sub-system is unable to control or account for this loss and the wider programming distributions that result.

This results in the expansion of the threshold voltage distributions in order to accommodate all possible threshold voltages for a given state. Furthermore, the charge loss associated with the shallow trap electrons can result in a reduction in the read window budget (RWB) corresponding to the programming distributions associated with the various programming levels. The RWB can refer to the cumulative value (e.g., in voltage) of a number (e.g., seven) of distances (e.g., measured in voltage) between adjacent threshold voltage distributions at a particular BER.

In a typical program-erase (P/E) operation cycle, after programming, a memory cell is left at a random programmed stage for a long period of time prior to being erased by an erase operation (also referred to as a "deep" or "strong" erase operation) in which the memory cell is subjected to a high erase voltage (e.g., Vera), such as approximately 16V to 22V. A strong erase operation is the process of removing electrons from the storage node and injecting holes into storage node in order to change the state of the memory cell to a "1" bit value. The strong erase operation includes applying an erase pulse to the memory cells that are undergoing erasure. The erase pulse can have a significant erase voltage level (Vera) of approximately 16V-22V or higher applied to strings of memory cells to erase the memory cell to a negative voltage bias (e.g., approximately −2.5V). The large negative voltage bias is established to repel electrons from the storage node due to the significant bias voltage (Vera) of the erase pulse.

In the time period between the programming and erase phases of a typical P/E cycle, a programmed memory cell remains at a threshold voltage corresponding to the programmed state until the memory cell is needed for further programming, at which time the memory cell is erased using the strong erase operation. During this idle time, the memory cells remain at a random data pattern of various programmed threshold voltage levels.

In some instances, a memory cell may be left a high threshold voltage level during this idle time prior to the strong erase operation, while other memory cells are left at a low threshold voltage level. If the memory cell remains at a high threshold voltage level (e.g., a threshold voltage level corresponding to a programming level having a high relative programmed threshold voltage level), the memory cell can be damaged when "baked" at the high threshold voltage, resulting in a reduced RWB and loss of retention (e.g., due to retention charge gain). Furthermore, memory cells remaining at a low threshold voltage level during the period following programming that are then erased to a strong erase state to enable a next P/E cycle also exhibits poor retention properties (e.g., due to electron trapping and a corresponding high charge loss).

For example, in a first P/E cycle, a particular memory cell may be programmed to a high Vt level (e.g., a level corresponding to a higher programming level, such as L6 or L7 in a TLC memory device). In a next P/E, since memory cells are programmed randomly to different programming levels, that particular memory cell may be programmed to lower programming level (e.g., L1 or L2 in a TLC memory device). In this example, a memory cell that remains idle at a high threshold voltage for an extended time, is erased and then programmed to a lower threshold voltage in a next P/E cycle can have a higher charge gain (e.g., the programming distribution is up-shifted from a target programming distribution) and a worse RWB (e.g., the programming distributions are closer together).

Similarly, a particular memory may be programmed in a previous P/E cycle to a low programming level and, following a strong erase operation, later programmed to a high voltage level in a next P/E cycle. In this example, the memory cell can have a higher charge loss, resulting in the down-shifting of the corresponding programming distribution and a reduced RWB due to the level-shifting.

In certain typical systems, memory sub-systems may implement a garbage collection process where valid data is identified on set of source memory blocks and relocated to an identified destination memory block. Following the relocation of the data, the source memory blocks are identified as "invalid" and marked with a flag or other label indicating that the memory blocks are ready to be erased. Accordingly, the garbage collection process identifies the memory blocks that can be erased (i.e., the memory blocks identified using the flag or other label).

In a memory sub-system employing an erase on demand approach, in response to a request to erase memory blocks, the memory blocks are not erased immediately. These memory blocks remain in a programmed state (e.g., at a random data pattern) until the memory sub-system indicates the memory blocks are needed for a subsequent programming operation, at which time the flagged memory blocks (i.e., the memory blocks flagged as part of the garbage collection process) are erased and then programmed. Accordingly, when the memory sub-system needs blocks to program, the flagged memory blocks are erased and programmed. During the time from identification as ready to be erased to the time the memory blocks are erased, the memory blocks may be maintained at a random data pattern which causes poor data retention performance.

According to aspects of the present disclosure, a multi-stage erase operation includes a first stage including a first erase sub-operation (also referred to as a "weak erase" sub-operation) and a second stage including a second erase sub-operation (also referred to as a "strong erase" sub-operation) to erase a target memory block of a memory device. In an embodiment, after receiving a signal to erase a memory block (when the memory blocks are available or identified to be erased), a first stage of a multi-stage erase operation is performed to erase the identified memory cells to a "weak" or "shallow" erase state. The weak erase sub-operation of the multi-stage erase operation is followed by a second stage during which the memory cells are erased to a "strong" or "deep" erase state. In an embodiment, during the first stage, a target memory cell of a memory block identified to be erased is subjected to a first erase voltage level (also referred to as "$Vera_{weak}$") to erase the target memory cell to a first erase state (also referred to a "targeted state" or "weak erase state"). In an embodiment, in the second stage, the target memory cell is subjected to a second erase voltage level (also referred to as "Vera").

During a time period between a programming of a target memory cell of a memory block and a strong erase operation of a P/E cycle, instead of leaving the target memory at a random data pattern (e.g., a random threshold voltage level) or strong erase voltage level, a weak erase sub-operation is executed to establish an intermediate threshold voltage (i.e., the first erase voltage level or $Vera_{weak}$) on the target memory cell. The setting of the first erase level during the idle time between the programming and execution of the strong erase sub-operation advantageously reduces cell damage or excessive electron trapping before the memory blocks are erased to the strong erase state. This results in improved performance in the memory device as the RWB is improved, reduce data retention degradation, and better cell reliability.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include not-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks. In one embodiment, the term "MLC memory" can be used to represent any type of memory cell that stores more than one bit per cell (e.g., 2 bits, 3 bits, 4 bits, or 5 bits per cell).

Although non-volatile memory components such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which includes a raw memory device 130 having control logic (e.g., local media controller 135) on the die and a controller (e.g., memory sub-system controller 115) for media management within the same memory device package. An example of a managed memory device is a managed NAND (MNAND) device.

In one embodiment, the memory sub-system 110 includes a memory interface component 113. Memory interface component 113 is responsible for handling interactions of memory sub-system controller 115 with the memory devices of memory sub-system 110, such as memory device 130. For example, memory interface component 113 can send memory access commands corresponding to requests received from host system 120 to memory device 130, such as program commands, read commands, or other commands. In addition, memory interface component 113 can receive data from memory device 130, such as data retrieved in response to a read command or a confirmation that a program command was successfully performed. For example, the memory sub-system controller 115 can include a processor 117 (processing device) configured to execute instructions stored in local memory 119 for performing the operations described herein.

In one embodiment, memory device 130 includes an erase manager 134 configured to carry out corresponding memory access operations, in response to receiving the memory access commands from memory interface 113. In some embodiments, local media controller 135 includes at least a portion of erase manager 134 and is configured to perform the functionality described herein. In some embodiments, erase manager 134 is implemented on memory device 130 using firmware, hardware components, or a combination of the above. In one embodiment, erase manager 134 receives, from a requestor, such as memory interface 113, a request to program data to a memory array of memory device 130. The memory array can include an array of memory cells formed at the intersections of wordlines and bitlines. In one embodiment, the memory cells are grouped into blocks, which can be further divided into sub-blocks, where a given wordline is shared across a number of sub-blocks, for example. In one embodiment, each sub-block corresponds to a separate plane in the memory array. The group of memory cells associated with a wordline within a sub-block is referred to as a physical page. In one embodiment, there can be multiple portions of the memory array, such as a first portion where the sub-blocks are configured as SLC memory and a second portion where the sub-blocks are configured as multi-level cell (MLC) memory (i.e., including memory cells that can store two or more bits of information per cell). For example, the second portion of the memory array can be configured as TLC memory. The voltage levels of the memory cells in TLC memory form a set of 8 programming distributions representing the 8 different combinations of the three bits stored in each memory cell. Depending on how the memory cells are configured, each physical page in one of the sub-blocks can include multiple page types. For example, a physical page formed from single level cells (SLCs) has a single page type referred to as a lower logical page (LP). Multi-level cell (MLC) physical page types can include LPs and upper logical pages (UPs), TLC physical page types are LPs, UPs, and extra logical pages (XPs), and QLC physical page types are LPs, UPs, XPs and top logical pages (TPs). For example, a physical page formed from memory cells of the QLC memory type can have a total of four logical pages, where each logical page can store data distinct from the data stored in the other logical pages associated with that physical page.

In one embodiment, erase manager 134 can execute a multi-stage erase operation including a first stage including a first erase sub-operation (i.e., a weak erase sub-operation) followed by a second stage including a second erase sub-operation (i.e., a strong erase sub-operation). In an embodiment, the erase manager 134 executes the multi-stage erase operation as part of a P/E cycle to establish a first erase voltage level on one or more target memory cells following a program operation relating to the target memory cells. In an embodiment, at a first time following the programming of the target memory cells, the erase manager 134 executes the first erase sub-operation using a first erase voltage level ($Vera_{weak}$) to erase the target memory cells to a first threshold voltage level (Vt1) in a range of approximately 0.5V to approximately 1.0V. In an embodiment, the first erase voltage level ($Vera_{weak}$) is in a range of approximately 12V to approximately 16V.

In an embodiment, at a second time following the execution of the first erase sub-operation, the erase manager 134 executes a second erase sub-operation. The second erase sub-operation is a strong erase operation where a second erase voltage level (e.g., approximately 16V to approximately 20V) is applied to erase the target memory cells to a second threshold voltage level (Vt2) in a range of approximately 0V to approximately −2.5V. Advantageously, execution of the first erase sub-operation in an idle time between a programming operation and the second erase sub-operation shifts the threshold voltage level of the memory cells to an intermediate level, as compared to a very high threshold voltage or a very low threshold voltage that can result from the memory cell being left at programming level corresponding to a random data pattern. The application of the first erase voltage (e.g., a weak erase pulse) of approximately 14V during the first erase sub-operation (i.e., the weak erase sub-operation) enables the setting of the first threshold voltage level (Vt1) of an intermediate threshold voltage level. Establishing the intermediate threshold voltage level reduces the issues of hole damage associated with maintaining a high threshold voltage during the idle time before a strong erase sub-operation and also reduces retention and charge gain issues associated with maintaining a low threshold voltage during the idle time before the strong erase sub-operation.

In an embodiment, erase manager 134 can execute a PE cycle including the programming of a set of target memory cells and a multi-stage erase operation including a first erase sub-operation (i.e., the weak erase sub-operation) and a second erase sub-operation (i.e., the strong erase sub-operation). In an embodiment, the programming operation can include a sequence of incrementally-increasing programming pulses applied to respective wordlines of memory cells to be programmed to target programming levels. In an embodiment, following the programming of the target memory cells, the erase manager 134 can execute the multi-stage erase operation. In an embodiment, the first erase sub-operation can include causing the application of a first erase pulse having a first erase voltage level (Vera-weak) to the target memory cells while approximately a ground voltage level (e.g., approximately 0V) is applied to the one or more wordlines associated with the memory cells to be erased. In an embodiment, at a second time, a second erase sub-operation (i.e., the strong erase sub-operation) is executed. In an embodiment, the second erase sub-operation can include causing the application of a second erase pulse having a second erase voltage level (Vera or Vera-strong) to the bitline associated with the target memory cells while approximately the ground voltage level (e.g., approximately 0V) is applied to the one or more wordlines associated with the memory cells to be erased.

Figure 1B:
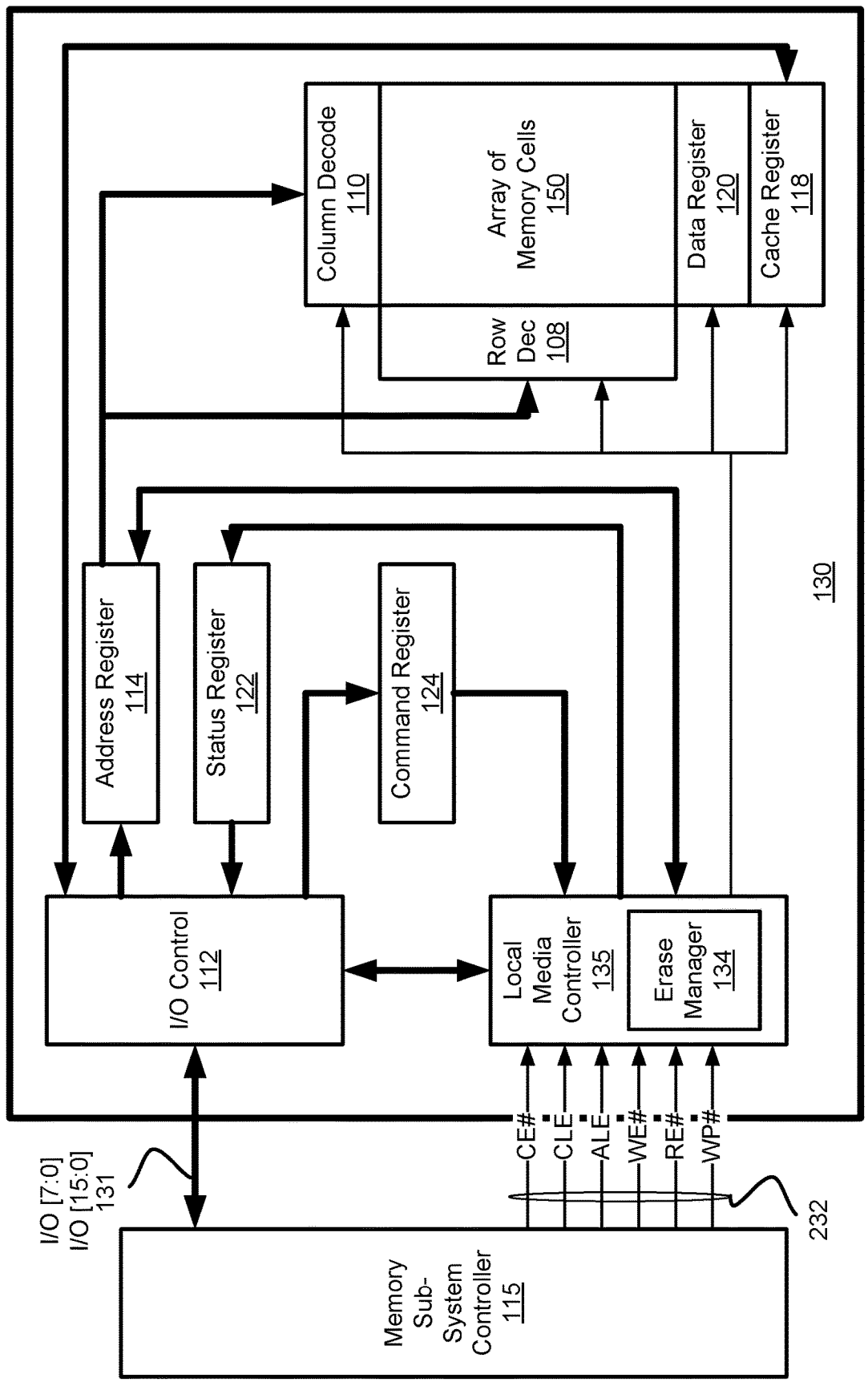
FIG. 1B is a block diagram of a memory device in communication with a memory sub-system controller of a memory sub-system according to an embodiment.

FIG. 1B is a simplified block diagram of a first apparatus, in the form of a memory device 130, in communication with a second apparatus, in the form of a memory sub-system controller 115 of a memory sub-system (e.g., memory sub-system 110 of FIG. 1A), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), may be a memory controller or other external host device.

Memory device 130 includes an array of memory cells 150 logically arranged in rows and columns. Memory cells of a logical row are typically connected to the same access line (e.g., a wordline) while memory cells of a logical column are typically selectively connected to the same data line (e.g., a bitline). A single access line may be associated with more than one logical row of memory cells and a single data line may be associated with more than one logical column. Memory cells (not shown in FIG. 1B) of at least a portion of array of memory cells 250 are capable of being programmed to one of at least two target data states.

Row decode circuitry 108 and column decode circuitry 110 are provided to decode address signals. Address signals are received and decoded to access the array of memory cells 150. Memory device 130 also includes input/output (I/O) control circuitry 112 to manage input of commands, addresses and data to the memory device 130 as well as output of data and status information from the memory device 130. An address register 114 is in communication with I/O control circuitry 212 and row decode circuitry 108 and column decode circuitry 110 to latch the address signals prior to decoding. A command register 124 is in communication with I/O control circuitry 112 and local media controller 135 to latch incoming commands.

A controller (e.g., the local media controller 135 internal to the memory device 130) controls access to the array of memory cells 150 in response to the commands and generates status information for the external memory sub-system controller 115, i.e., the local media controller 135 is configured to perform access operations (e.g., read operations, programming operations and/or erase operations) on the array of memory cells 150. The local media controller 135 is in communication with row decode circuitry 108 and column decode circuitry 110 to control the row decode circuitry 108 and column decode circuitry 110 in response to the addresses. In one embodiment, local media controller 135 includes erase manager 134, which can implement the push-pull programming operation including the soft erase sub-operation to manage charge loss during programming of memory device 130, as described herein.

The local media controller 135 is also in communication with a cache register 118. Cache register 118 latches data, either incoming or outgoing, as directed by the local media controller 135 to temporarily store data while the array of memory cells 150 is busy writing or reading, respectively, other data. During a program operation (e.g., write operation), data may be passed from the cache register 118 to the data register 120 for transfer to the array of memory cells 150; then new data may be latched in the cache register 118 from the I/O control circuitry 212. During a read operation, data may be passed from the cache register 118 to the I/O control circuitry 112 for output to the memory sub-system controller 115; then new data may be passed from the data register 120 to the cache register 118. The cache register 118 and/or the data register 120 may form (e.g., may form a portion of) a page buffer of the memory device 130. A page buffer may further include sensing devices (not shown in FIG. 1B) to sense a data state of a memory cell of the array of memory cells 150, e.g., by sensing a state of a data line connected to that memory cell. A status register 122 may be in communication with I/O control circuitry 112 and the local memory controller 135 to latch the status information for output to the memory sub-system controller 115.

Memory device 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) may be further received over control link 132 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 131 and outputs data to the memory sub-system controller 115 over I/O bus 131.

For example, the commands may be received over input/output (I/O) pins [7:0] of I/O bus 131 at I/O control circuitry 112 and may then be written into command register 124. The addresses may be received over input/output (I/O) pins [7:0] of I/O bus 234 at I/O control circuitry 112 and may then be written into address register 114. The data may be received over input/output (I/O) pins [7:0] for an 8-bit device or input/output (I/O) pins [15:0] for a 16-bit device at I/O control circuitry 112 and then may be written into cache register 118. The data may be subsequently written into data register 120 for programming the array of memory cells 150.

In an embodiment, cache register 118 may be omitted, and the data may be written directly into data register 120. Data may also be output over input/output (I/O) pins [7:0] for an 8-bit device or input/output (I/O) pins [15:0] for a 16-bit device. Although reference may be made to I/O pins, they may include any conductive node providing for electrical connection to the memory device 130 by an external device (e.g., the memory sub-system controller 115), such as conductive pads or conductive bumps as are commonly used.

It will be appreciated by those skilled in the art that additional circuitry and signals can be provided, and that the memory device 130 of FIG. 1B has been simplified. It should be recognized that the functionality of the various block components described with reference to FIG. 1B may not necessarily be segregated to distinct components or component portions of an integrated circuit device. For example, a single component or component portion of an integrated circuit device could be adapted to perform the functionality of more than one block component of FIG. 1B. Alternatively, one or more components or component portions of an integrated circuit device could be combined to perform the functionality of a single block component of FIG. 1B. Additionally, while specific I/O pins are described in accordance with popular conventions for receipt and output of the various signals, it is noted that other combinations or numbers of I/O pins (or other I/O node structures) may be used in the various embodiments.

Figure 2A:
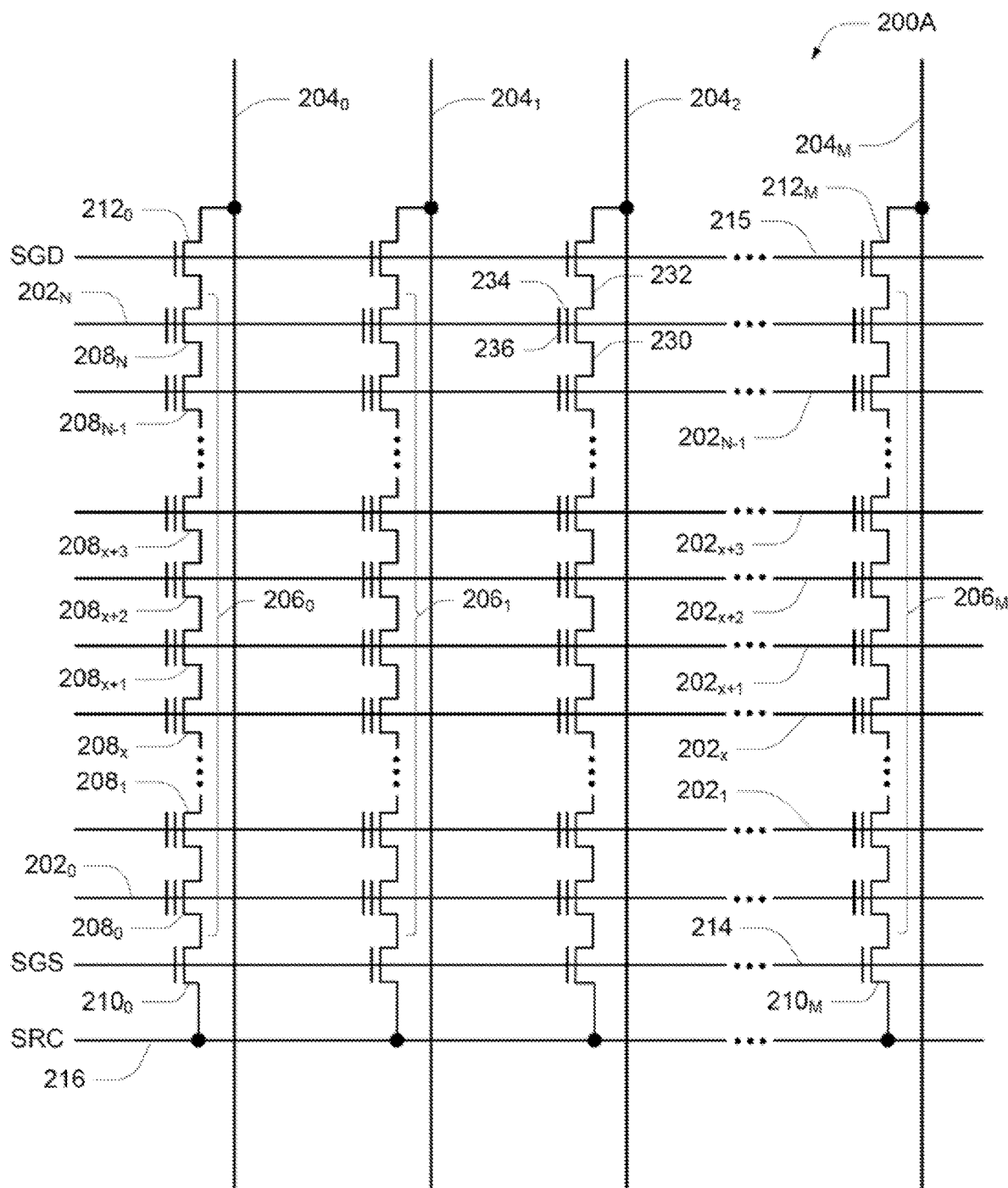
FIG. 2A-2C are schematics of portions of an array of memory cells as could be used in a memory of the type described with reference to FIG. 1B according to an embodiment.
Figure 2B:
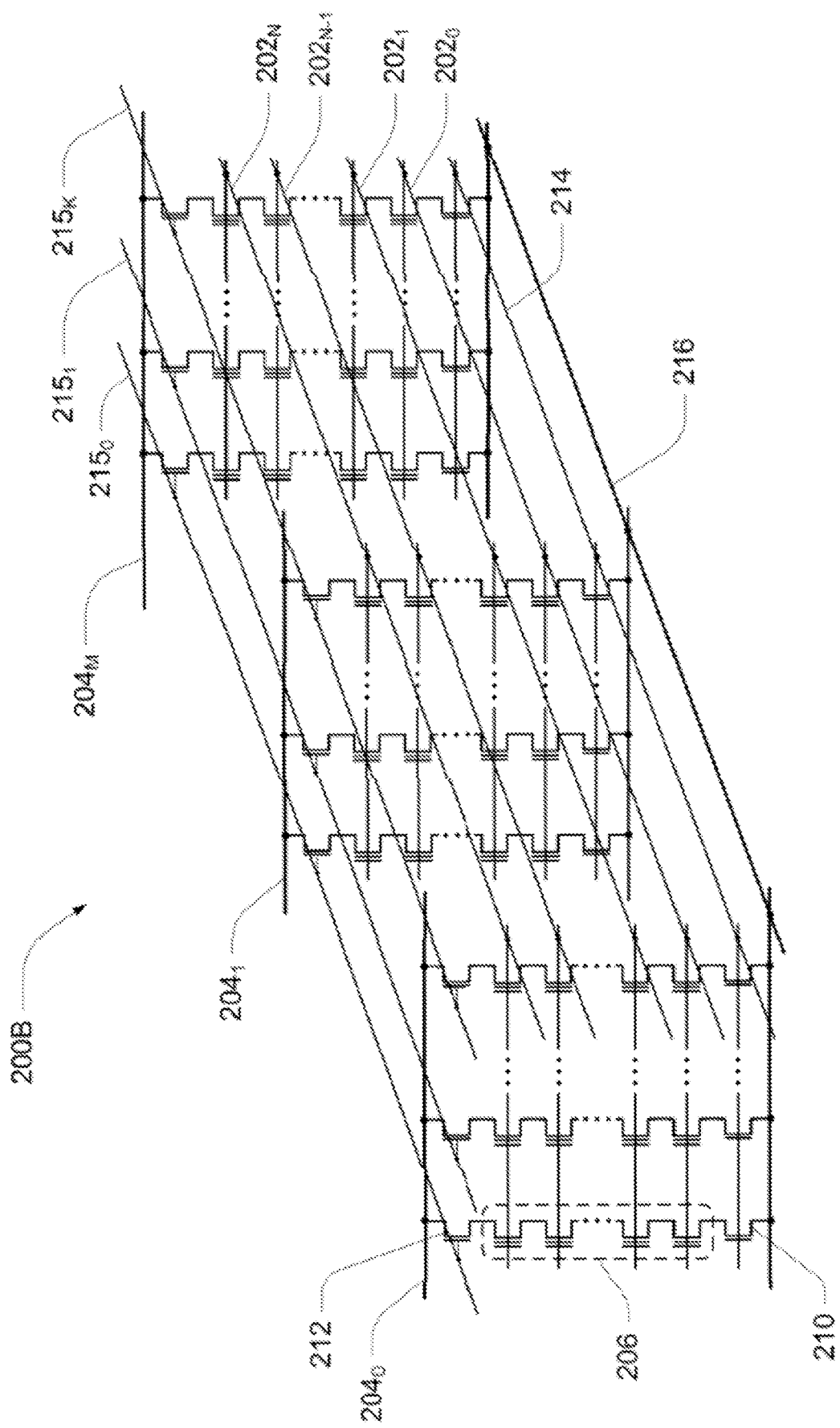
Figure 2C:
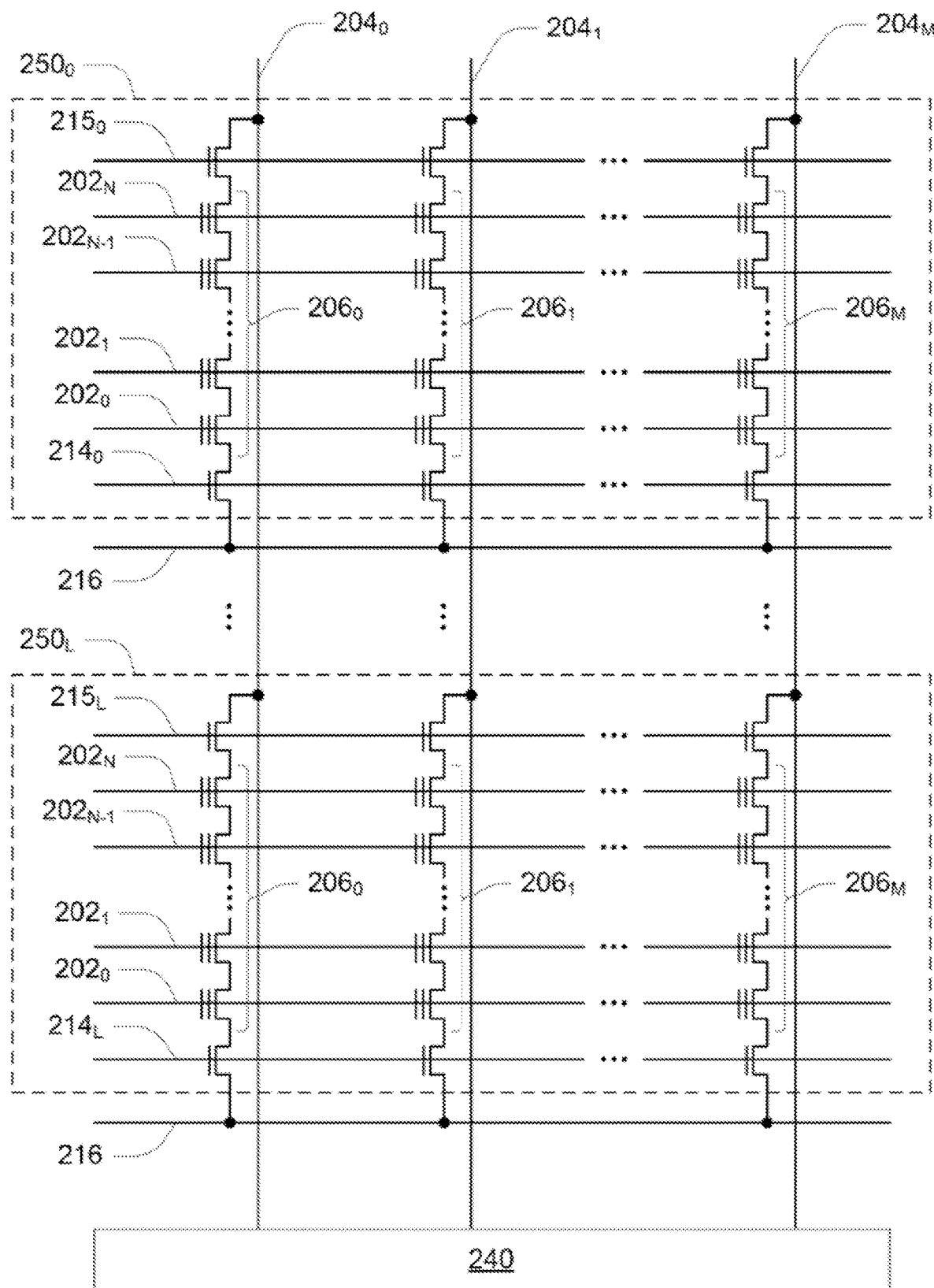

FIG. 2A-2C are schematics of portions of an array of memory cells 200A, such as a NAND memory array, as could be used in a memory of the type described with reference to FIG. 1B according to an embodiment, e.g., as a portion of the array of memory cells 104. Memory array 200A includes access lines, such as wordlines $202_0$ to $202_N$, and data lines, such as bitlines $204_0$ to $204_M$. The wordlines 202 can be connected to global access lines (e.g., global wordlines), not shown in FIG. 2A, in a many-to-one relationship. For some embodiments, memory array 200A can be formed over a semiconductor that, for example, can be conductively doped to have a conductivity type, such as a p-type conductivity, e.g., to form a p-well, or an n-type conductivity, e.g., to form an n-well.

Memory array 200A can be arranged in rows (each corresponding to a wordline 202) and columns (each corresponding to a bitline 204). Each column can include a string of series-connected memory cells (e.g., non-volatile memory cells), such as one of NAND strings $206_0$ to $206_M$. Each NAND string 206 can be connected (e.g., selectively connected) to a common source (SRC) 216 and can include memory cells $208_0$ to $208_N$. The memory cells 208 can represent non-volatile memory cells for storage of data. The memory cells 208 of each NAND string 206 can be connected in series between a select gate 210 (e.g., a field-effect transistor), such as one of the select gates $210_0$ to $210_M$ (e.g., that can be source select transistors, commonly referred to as select gate source), and a select gate 212 (e.g., a field-effect transistor), such as one of the select gates $212_0$ to $212_M$ (e.g., that can be drain select transistors, commonly referred to as select gate drain). Select gates $210_0$ to $210_M$ can be commonly connected to a select line 214, such as a source select line (SGS), and select gates $212_0$ to $212_M$ can be commonly connected to a select line 215, such as a drain select line (SGD). Although depicted as traditional field-effect transistors, the select gates 210 and 212 can utilize a structure similar to (e.g., the same as) the memory cells 208. The select gates 210 and 212 can represent a number of select gates connected in series, with each select gate in series configured to receive a same or independent control signal.

A source of each select gate 210 can be connected to common source 216. The drain of each select gate 210 can be connected to a memory cell $208_0$ of the corresponding NAND string 206. For example, the drain of select gate $210_0$ can be connected to memory cell $208_0$ of the corresponding NAND string $206_0$. Therefore, each select gate 210 can be configured to selectively connect a corresponding NAND string 206 to the common source 216. A control gate of each select gate 210 can be connected to the select line 214.

The drain of each select gate 212 can be connected to the bitline 204 for the corresponding NAND string 206. For example, the drain of select gate $212_0$ can be connected to the bitline $204_0$ for the corresponding NAND string $206_0$. The source of each select gate 212 can be connected to a memory cell $208_N$ of the corresponding NAND string 206. For example, the source of select gate $212_0$ can be connected to memory cell $208_N$ of the corresponding NAND string $206_0$. Therefore, each select gate 212 can be configured to selectively connect a corresponding NAND string 206 to the corresponding bitline 204. A control gate of each select gate 212 can be connected to select line 215.

The memory array 200A in FIG. 2A can be a quasi-two-dimensional memory array and can have a generally planar structure, e.g., where the common source 216, NAND strings 206 and bitlines 204 extend in substantially parallel planes. Alternatively, the memory array 200A in FIG. 2A can be a three-dimensional memory array, e.g., where NAND strings 206 can extend substantially perpendicular to a plane containing the common source 216 and to a plane containing the bitlines 204 that can be substantially parallel to the plane containing the common source 216.

Typical construction of memory cells 208 includes a data-storage structure 234 (e.g., a floating gate, charge trap, and the like) that can determine a data state of the memory cell (e.g., through changes in threshold voltage), and a control gate 236, as shown in FIG. 2A. The data-storage structure 234 can include both conductive and dielectric structures while the control gate 236 is generally formed of one or more conductive materials. In some cases, memory cells 208 can further have a defined source/drain (e.g., source) 230 and a defined source/drain (e.g., drain) 232. The memory cells 208 have their control gates 236 connected to (and in some cases form) a wordline 202.

A column of the memory cells 208 can be a NAND string 206 or a number of NAND strings 206 selectively connected to a given bitline 204. A row of the memory cells 208 can be memory cells 208 commonly connected to a given wordline 202. A row of memory cells 208 can, but need not, include all the memory cells 208 commonly connected to a given wordline 202. Rows of the memory cells 208 can often be divided into one or more groups of physical pages of memory cells 208, and physical pages of the memory cells 208 often include every other memory cell 208 commonly connected to a given wordline 202. For example, the memory cells 208 commonly connected to wordline $202_N$ and selectively connected to even bitlines 204 (e.g., bitlines $204_0$, $204_2$, $204_4$, etc.) can be one physical page of the memory cells 208 (e.g., even memory cells) while memory cells 208 commonly connected to wordline $202_N$ and selectively connected to odd bitlines 204 (e.g., bitlines $204_1$, $204_3$, $204_5$, etc.) can be another physical page of the memory cells 208 (e.g., odd memory cells).

Although bitlines $204_3$-$204_5$ are not explicitly depicted in FIG. 2A, it is apparent from the figure that the bitlines 204 of the array of memory cells 200A can be numbered consecutively from bitline $204_0$ to bitline $204_M$. Other groupings of the memory cells 208 commonly connected to a given wordline 202 can also define a physical page of memory cells 208. For certain memory devices, all memory cells commonly connected to a given wordline can be deemed a physical page of memory cells. The portion of a physical page of memory cells (which, in some embodiments, could still be the entire row) that is read during a single read operation or programmed during a single programming operation (e.g., an upper or lower page of memory cells) can be deemed a logical page of memory cells. A block of memory cells can include those memory cells that are configured to be erased together, such as all memory cells connected to wordlines $202_0$-$202_N$ (e.g., all NAND strings 206 sharing common wordlines 202). Unless expressly distinguished, a reference to a page of memory cells herein refers to the memory cells of a logical page of memory cells. Although the example of FIG. 2A is discussed in conjunction with NAND flash, the embodiments and concepts described herein are not limited to a particular array architecture or structure, and can include other structures (e.g., SONOS, phase change, ferroelectric, etc.) and other architectures (e.g., AND arrays, NOR arrays, etc.).

FIG. 2B is another schematic of a portion of an array of memory cells 200B as could be used in a memory of the type described with reference to FIG. 1B, e.g., as a portion of the array of memory cells 104. Like numbered elements in FIG. 2B correspond to the description as provided with respect to FIG. 2A. FIG. 2B provides additional detail of one example of a three-dimensional NAND memory array structure. The three-dimensional NAND memory array 200B can incorporate vertical structures which can include semiconductor pillars where a portion of a pillar can act as a channel region of the memory cells of NAND strings 206. The NAND strings 206 can be each selectively connected to a bitline $204_0$-$204_M$ by a select transistor 212 (e.g., that can be drain select transistors, commonly referred to as select gate drain) and to a common source 216 by a select transistor 210 (e.g., that can be source select transistors, commonly referred to as select gate source). Multiple NAND strings 206 can be selectively connected to the same bitline 204. Subsets of NAND strings 206 can be connected to their respective bitlines 204 by biasing the select lines $215_0$-$215_K$ to selectively activate particular select transistors 212 each between a NAND string 206 and a bitline 204. The select transistors 210 can be activated by biasing the select line 214. Each wordline 202 can be connected to multiple rows of memory cells of the memory array 200B. Rows of memory cells that are commonly connected to each other by a particular wordline 202 can collectively be referred to as tiers.

FIG. 2C is a further schematic of a portion of an array of memory cells 200C as could be used in a memory of the type described with reference to FIG. 1B, e.g., as a portion of the array of memory cells 104. Like numbered elements in FIG. 2C correspond to the description as provided with respect to FIG. 2A. The array of memory cells 200C can include strings of series-connected memory cells (e.g., NAND strings) 206, access (e.g., word) lines 202, data (e.g., bit) lines 204, select lines 214 (e.g., source select lines), select lines 215 (e.g., drain select lines) and a source 216 as depicted in FIG. 2A. A portion of the array of memory cells 200A can be a portion of the array of memory cells 200C, for example.

FIG. 2C depicts groupings of NAND strings 206 into blocks of memory cells 250, e.g., blocks of memory cells $250_0$-$250_L$. Blocks of memory cells 250 can be groupings of memory cells 208 that can be erased together in a single erase operation, sometimes referred to as erase blocks. Each block of memory cells 250 can represent those NAND strings 206 commonly associated with a single select line 215, e.g., select line $215_0$. The source 216 for the block of memory cells $250_0$ can be a same source as the source 216 for the block of memory cells $250_L$. For example, each block of memory cells $250_0$-$250_L$ can be commonly selectively connected to the source 216. Access lines 202 and select lines 214 and 215 of one block of memory cells 250 can have no direct connection to access lines 202 and select lines 214 and 215, respectively, of any other block of memory cells of the blocks of memory cells $250_0$-$250_L$.

The bitlines $204_0$-$204_M$ can be connected (e.g., selectively connected) to a buffer portion 240, which can be a portion of the page buffer 152 of the memory device 130. The buffer portion 240 can correspond to a memory plane (e.g., the set of blocks of memory cells $250_0$-$250_L$). The buffer portion 240 can include sense circuits (which can include sense amplifiers) for sensing data values indicated on respective bitlines 204.

FIG. 3 is a block schematic of a portion of an array of memory cells 300 as could be used in a memory of the type described with reference to FIG. 1B. The array of memory cells 300 is depicted as having four memory planes 350 (e.g., memory planes $350_0$-$350_3$), each in communication with a respective buffer portion 240, which can collectively form a page buffer 352. While four memory planes 350 are depicted, other numbers of memory planes 350 can be commonly in communication with a page buffer 352. Each memory plane 350 is depicted to include L+1 blocks of memory cells 250 (e.g., blocks of memory cells $250_0$-$250_L$).

Figure 4:
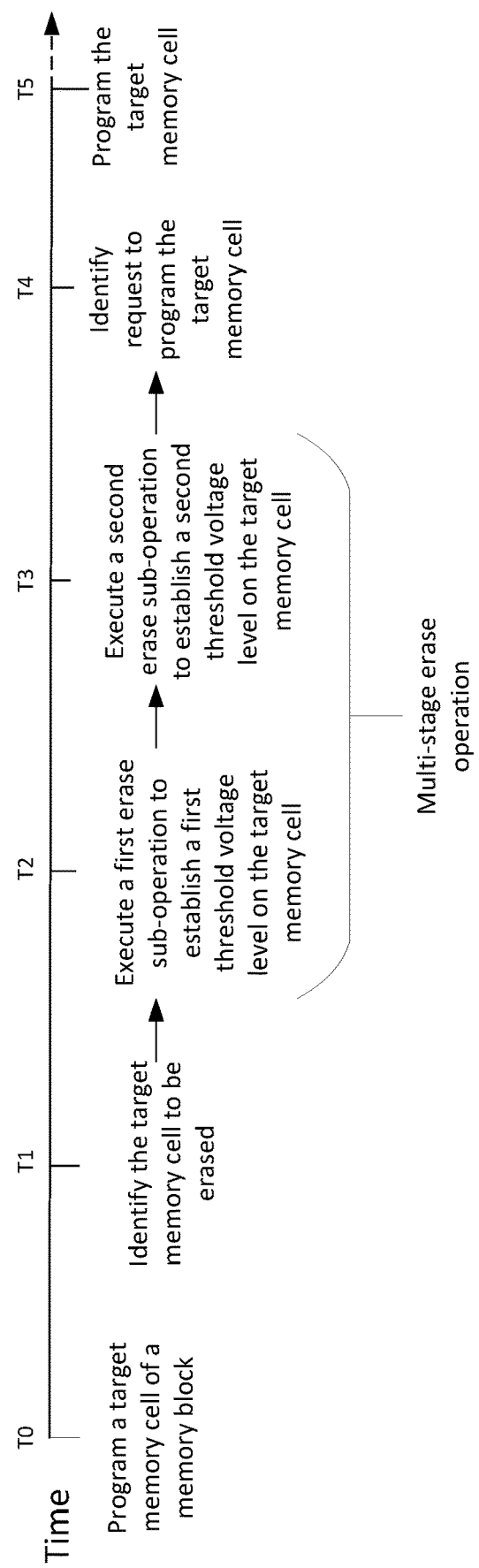
FIG. 4 is an example timeline corresponding to execution of an example PE cycle including a multi-stage erase operation to erase a memory block including target memory cells of a memory device identified for erasing in advance of a subsequent programming operation in accordance with one or more embodiments of the present disclosure

FIG. 4 is an example timeline corresponding to execution of an example PE cycle including a multi-stage erase operation to erase a memory block including target memory cells of a memory device identified for erasing in advance of a programming operation of a subsequent PE cycle in accordance with one or more embodiments of the present disclosure. As shown in FIG. 4, a program operation or algorithm can be initiated at a first time (TO) to program a set of one or more target memory cells of a memory device. At time T1, the set of one or more target memory cells are identified to be erased. In an embodiment, the set of target memory cells can be identified for erasing in response to a command (e.g., a command from a host system to erase the target memory cells of the memory block). In an embodiment, in the time period between TO and T1, the programmed memory cells can be subject to a typical workload (e.g., random read operations, garbage collection operations, etc.) until the command is received to erase the target memory cells at time T1. In an embodiment, the garbage collection process can identify the one or more source blocks including valid data that can be relocated to one or more destination blocks and identified to be erase in accordance with the multi-stage erase operation.

In an embodiment, at time T2, a first erase sub-operation is executed on the memory block associated with the memory cells to be erased. The first erase sub-operation can include an erase pulse that has a first erase voltage level (i.e., a Vera-weak). In an embodiment, the Vera-weak can be in a range of approximately 12V to 16V to establish a first threshold voltage level (e.g., approximately 0.5V) on the target memory cells.

The first erase sub-operation (i.e., the weak erase sub-operation) includes the application of an erase pulse having a first erase voltage (i.e., Vera-weak) and uses a first erase verify level (e.g., approximately −2.0V to approximately 2V) to verify the first threshold voltage level (e.g., approximately −2.0V to approximately 2V) of the target memory cells.

In an embodiment, during a period after time T2, the memory sub-system may monitor a number of memory blocks that have been strongly erased in accordance with the second erase sub-operation of the multi-stage erase operation and are in condition for programming in a next programming cycle. In this example, when the number of strongly erased memory blocks in this buffer or spare pool falls below the threshold number, the memory sub-system controller can identify a memory block that has been weakly erased in accordance with the first erase sub-operation (at time T2) and perform the second erase sub-operation to strongly erase that memory block to the second threshold voltage level (at time T3) to make that memory block available for a subsequent programming operation.

In the example shown in FIG. 4, at time T3, a second erase sub-operation is executed. In an embodiment, the second erase sub-operation (i.e., the strong erase sub-operation) includes the application of one or more erase pulses having a second erase voltage (i.e., Vera of approximately 18V to 20V). A second erase verify level (e.g., approximately −2.5V) is used to verify the second threshold voltage level (e.g., approximately −2.5V) of the target memory cells to confirm the strong erase of the corresponding memory block is completed. In an embodiment, Vera-weak (i.e., the first erase voltage level used in the first erase sub-operation) is approximately 3V to 6V less than Vera (i.e., the second erase voltage used in the second erase sub-operation).

Following the first erase sub-operation, during the time period between T2 and T3, the memory cells are set to the first threshold voltage level (e.g., approximately 0V to 1V). The first threshold voltage level is further reduced to the second threshold voltage level (e.g., approximately −2.5V, −3.0V, etc.) following completion of the second erase sub-operation of the multi-stage erase operation. In an embodiment, the second threshold voltage level resulting from the second erase sub-operation is less than (or stronger than) the first threshold voltage level resulting from the first erase sub-operation. In an embodiment, the memory sub-system controller can identify the memory block associated with the target memory cells as being needed for programming as part of a next or subsequent programming operation (e.g., a next P/E cycle). In response to identification of the memory block associated with the target memory cell at the first threshold level due to the first erase sub-operation, the second erase sub-operation can be executed at time T3.

At time T4, a command can be issued to program the target memory cells which have been erased to the second threshold voltage level as a result of the second erase sub-operation. At a subsequent time (T5), a next P/E cycle can be performed including a next programming operation relating to the target memory cells followed by a next multi-stage erase operation (not shown in FIG. 4). According to embodiments, the delay or time spacing between T1 and T2 and T3 and T4 can be relatively short, while there can be a longer delay (e.g., due to the performance of erase, program and read operations of other blocks or idle time) between T2 and T3.

Figure 5:
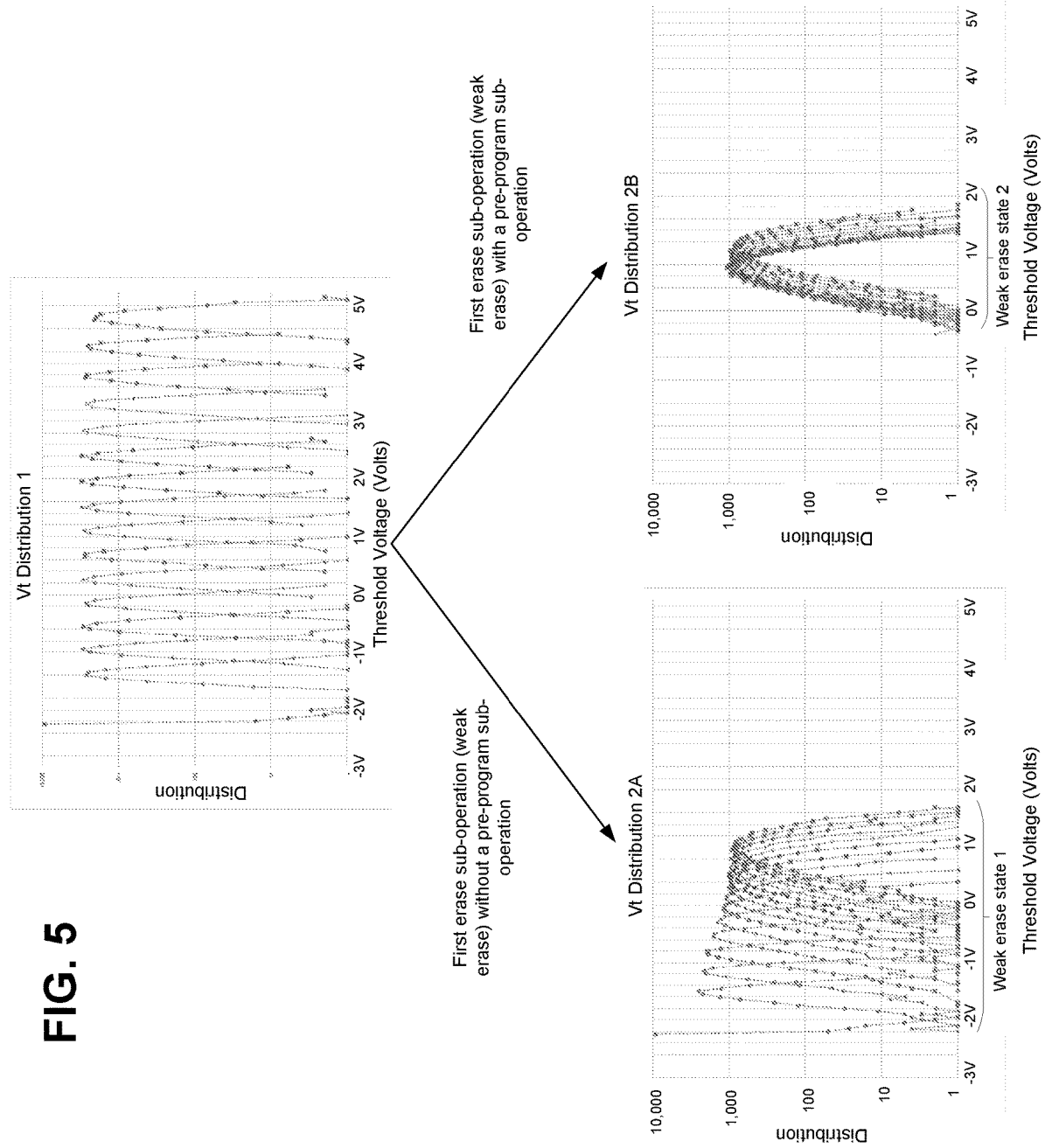
FIG. 5 illustrates example threshold voltage distributions associated with execution of a first erase sub-operation of a multi-stage erase operation, according to embodiments of the present disclosure.

FIG. 5 illustrates example threshold voltage distributions associated with execution of a first erase sub-operation of a multi-stage erase operation, according to embodiments of the present disclosure. In an embodiment, following a programming operation (e.g., a programming operation at time T0 in FIG. 4), the memory cells have a random data pattern as illustrated in the first threshold voltage distribution (Vt Distribution 1) of FIG. 5. As illustrated, the threshold voltages of the programmed memory cells programmed to the different programming levels (e.g., L0 to L7 in a TLC memory device) range from approximately −2.0V to approximately 5V. In an embodiment, instead of leaving the memory cells at the random data pattern of varying threshold voltages, as shown in Vt distribution 1, the first erase sub-operation is executed (i.e., the weak erase sub-operation executed at time T2 of FIG. 4).

In one embodiment, the first erase sub-operation includes a shallow or weak erase loop including applying one or more erase pulses having a first erase voltage level (e.g., in a range of approximately 3V to 6V lower than a normal or strong erase voltage level of approximately 16V to 20V) and one or more erase verify operations are performed on the one or more memory blocks including the set of target memory cells to be erased. As shown in FIG. 5, execution of the first erase sub-operation results in a threshold voltage distribution (Vt Distribution 2A) where a first threshold voltage is established on the memory cells (i.e., Weak erase state 1). As illustrated in the example of FIG. 5, the first threshold voltage level (Weak erase state 1) resulting from application of the Vera-weak erase pulse in the weak erase loop of the first erase sub-operation is in a range of approximately −2.0V to approximately 2V. As shown in FIG. 5, the memory cells having a high threshold voltage level are erased to an intermediate threshold voltage level, while the memory cells having a relatively low threshold voltage level (i.e., below the intermediate threshold voltage level) do not have a shift in the corresponding threshold voltage.

In another embodiment, to further tighten the threshold voltage distributions resulting from the first erase sub-operation, the first erase sub-operation (i.e., the weak erase sub-operation) can include a pre-program sub-operation prior to execution of the weak erase loop. In this embodiment, the pre-program sub-operation includes applying one or more programming pulses to increase the threshold voltage level of the relatively low threshold voltage levels of Vt Distribution 1 prior to execution of the weak erase loop of the first erase sub-operation. As a result, following the pre-program sub-operation and the weak erase loop, the threshold voltage distribution (Vt Distribution 2B) is tighter as compared to Vt Distribution 2A (i.e., the distribution without the use of the pre-program sub-operation). As illustrated in the example of FIG. 5, the first threshold voltage level resulting from the first erase sub-operation including the pre-program sub-operation followed by the weak erase loop including application of the one or more Vera-weak erase pulses is in a range of approximately −0.5V to approximately 2V (i.e., Weak erase state 2). In an embodiment, the pre-program sub-operation includes the application of one or more high voltage programming pulses (e.g., in a range of approximately 12V to 14V) applied to wordlines associated with all of the memory cells of Vt Distribution 1, where a set of memory cells having the relatively lower threshold voltages experience a change (i.e., an increase) in threshold voltage, while the memory cells having the relatively higher threshold voltages are unaffected, prior to execution of the weak erase loop. This results in the setting of the memory cells in the Weak erase state 2 (e.g., in a tighter distribution and threshold voltage range of approximately −0.5V and approximately 2.0V) following execution of the first erase sub-operation including the pre-program sub-operation.

Figure 6:
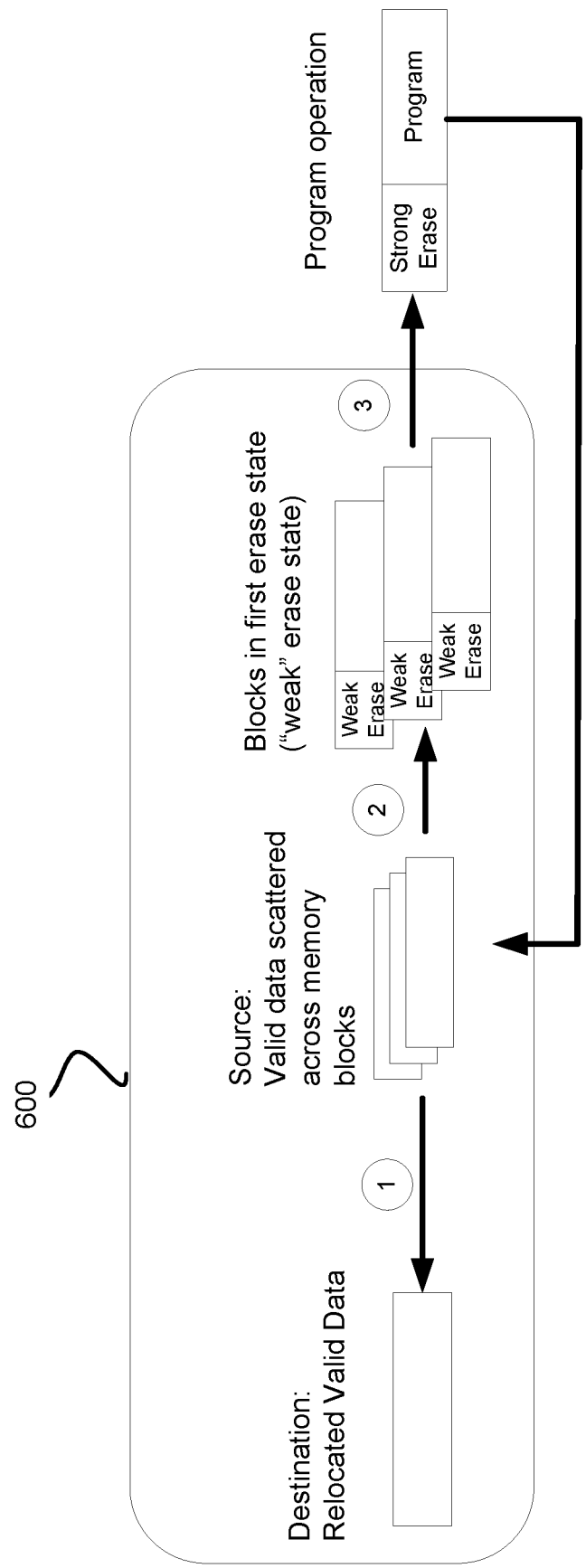
FIG. 6 illustrates an example garbage collection process including a multi-stage erase operation, according to embodiments of the present disclosure.

FIG. 6 illustrates an example garbage collection process 600 including a multi-stage erase operation, according to embodiments of the present disclosure. As shown in FIG. 6, in step 1 of the garbage collection process 600, a scatter-gather process is executed to identify valid data scattered across source blocks and relocate the valid data to the one or more destination blocks. During the scatter-gather process, a set of memory blocks that can be erased are identified and denoted with a flag or other indicator. In an embodiment, in step 2, the memory blocks identified by the flag as ready for erasing are subjected to the first erase sub-operation (i.e., the weak erase sub-operation) of the multi-stage erase operation. The first erase sub-operation results in one or more memory blocks in the weak erase state. In an embodiment, in step 3, the second erase sub-operation (i.e., the strong erase sub-operation) is performed to place the target memory blocks in the strong erase state. In an embodiment, the targeted memory cells that have been erased in accordance with the multi-stage erase operation can then be programmed in accordance with a programming operation of a subsequent P/E cycle. In an embodiment, when a memory block is needed for a subsequent programming operation, a memory block in a pool or buffer of blocks in the weak erase state can be identified, subjected to the strong erase operation, and programmed.

FIG. 7 is a flow diagram of an example method 700 of a PE cycle including a multi-stage erase operation to erase a memory cell of a memory device in a memory sub-system in accordance with some embodiments of the present disclosure. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by erase manager 134 of FIG. 1A and FIG. 1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 710, a memory cell is programmed. For example, processing logic (e.g., erase manager 134) can execute a programming operation to program a memory cell of a memory device to a programming level. In an embodiment, the memory cell can be programmed to a threshold voltage level corresponding to the programming level of multiple different programming levels (e.g., L1 to L7 of a TLC memory device or L1 to L15 of a QLC memory device). In an embodiment, the first programming level and corresponding threshold voltage of the programmed memory cell can be a relatively low programming level (e.g., L1, L2, or L3). In an embodiment, the first programming level and corresponding threshold voltage of the programmed memory cell can be a relatively high programming level (e.g., L5, L6, or L7 of a TLC memory device or L13, L14, or L15 of a QLC memory device). In an embodiment, the processing logic can receive, from a requestor, such as a memory interface 113 of a memory sub-system controller 115, a request to perform the programming operation on a memory array, such as memory array 250, of a memory device, such as memory device 130. In one embodiment, the memory access operation comprises a program operation to program the set of memory cells to a set of programming levels (e.g., L1 to L7; wherein L0 is an erase state of a TLC memory device or L1 to L15 of a QLC memory device). In an embodiment, the program operation is directed to one or more specific memory cell addresses. In one embodiment, the set of memory cells are configured as MLC memory (e.g., any type of memory cells that store more than one bit per cell including 2 bits, 3 bits, 4 bits, or more bits per cell). In an embodiment, the request includes a set of physical or logical addresses corresponding to the set of memory cells to be programmed. In an embodiment, the processing logic identifies the set of memory cells based on the set of addresses provided as part of the request.

At operation 720, an erase pulse is applied. For example, the processing logic can execute a first erase sub-operation to erase the memory cell to a first threshold voltage level, the first erase sub-operation including applying, to the memory cell, a first erase pulse having a first erase voltage level. In an embodiment, the first erase sub-operation or weak erase sub-operation includes applying the erase pulse at the first erase voltage level (Vera-weak). In an embodiment, Vera-weak is in a range of approximately 12V to 16V. In an embodiment, the first erase sub-operation is executed at a first time following execution of the programming operation in operation 710 to erase the memory cell to the first threshold voltage level. In an embodiment, if the memory cell is programmed to a relatively high threshold voltage level in operation 710, the first threshold voltage level resulting from the first erase sub-operation is lower than the threshold voltage corresponding to the first programming level to which the memory cell was programmed. In an embodiment, if the memory cell is programmed to a relatively low threshold voltage level in operation 710, the first threshold voltage level resulting from the first erase sub-operation is higher than the threshold voltage corresponding to the first programming level to which the memory cell was programmed. In an embodiment, the first threshold voltage level of the memory cell following execution of the first erase sub-operation is an intermediate threshold voltage relative to the range of threshold voltages corresponding to the multiple programming levels resulting from the programming operation of operation 710.

In an embodiment, the first erase sub-operation can be executed in response to the identification of the memory cell as a cell that is ready for erasure. In an embodiment, the indication that the memory cell is ready to be erased can be generated by a garbage collection process executed with respect to the memory device, as described above with reference to FIG. 6.

At operation 730, a further erase pulse is applied. For example, the processing logic can execute a second erase sub-operation to erase the memory cell to a second threshold voltage level, the second erase sub-operation including applying, to the memory cell, a second erase pulse having a second erase voltage level. In an embodiment, the second erase sub-operation or strong erase sub-operation includes applying the erase pulse at the second first erase voltage level (Vera). In an embodiment, Vera is in a range of approximately 16V to 22V. In an embodiment, the Vera is a higher voltage than Vera-weak. In an embodiment, the second erase sub-operation is executed at a second time following the first time of the first erase sub-operation of operation 720 to erase the memory cell to the second threshold voltage level. In an embodiment, the second threshold voltage level (e.g., in a range of approximately −3V to approximately −2V) is a lower voltage than the first threshold voltage level (e.g., in a range of approximately 0V to approximately 1V), resulting in the memory cell being strongly erased as a result of the second erase sub-operation. In an embodiment, following the strong erase of the memory cell resulting from the second erase sub-operation, the memory cell is ready to be programmed in accordance with a subsequent programming operation of a subsequent P/E cycle.

In an embodiment, the first erase sub-operation is executed at a first time following the programming operation and prior to the execution of the second erase sub-operation. Advantageously, execution, at the first time, of the first erase sub-operation sets an intermediate threshold voltage on the memory cell (as compared to the threshold voltage of the cell if left at the random data pattern of the programming operation). The memory cell can remain at the intermediate threshold voltage level (i.e., the first threshold voltage level) until the execution of the strong erase sub-operation (i.e., the second erase sub-operation) to improve the data retention characteristics of the memory cell, reduce cell damage, and reduce excessive electron trapping.

Figure 8:
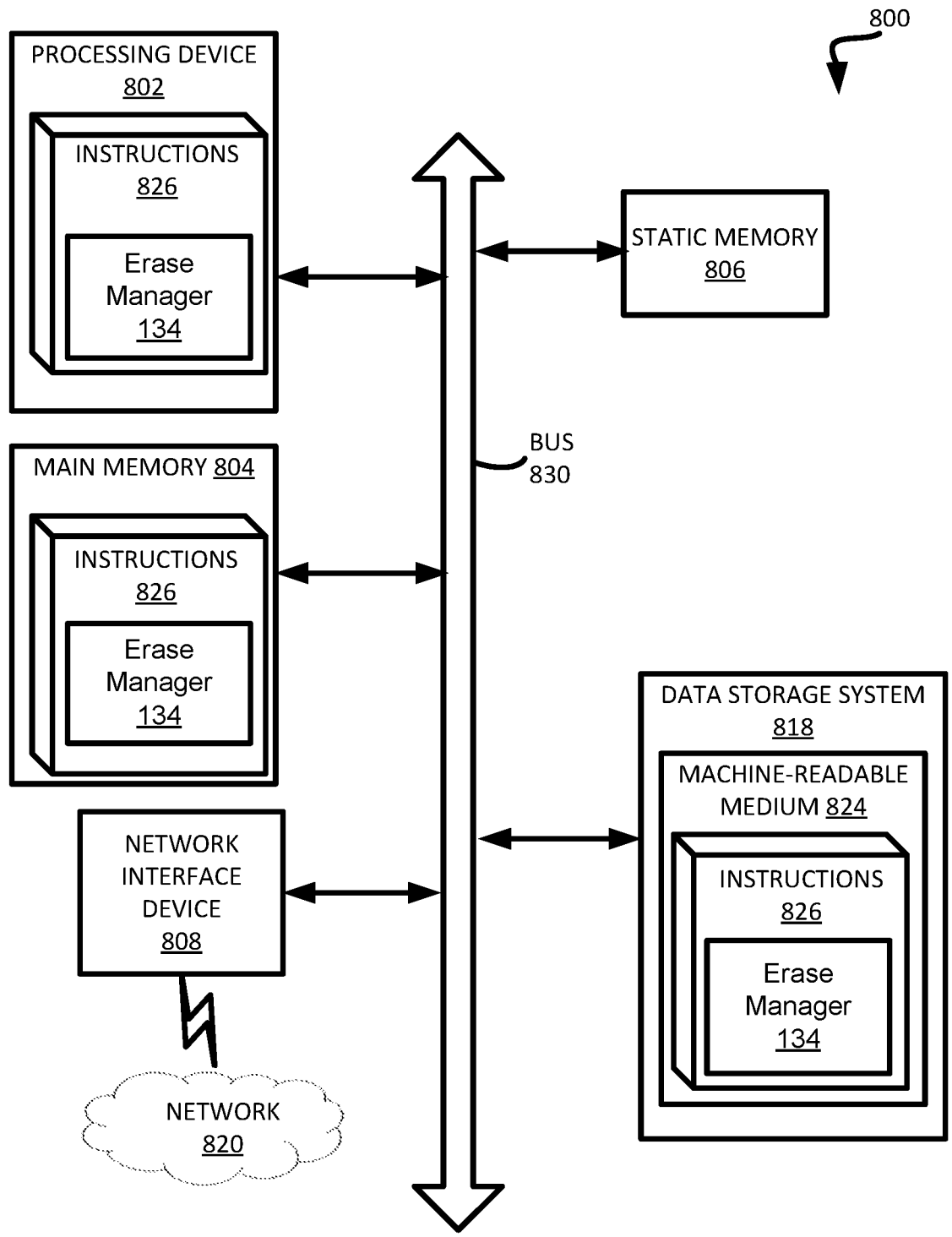
FIG. 8 is a block diagram of an example computer system in which embodiments of the present disclosure can operate.

FIG. 8 illustrates an example machine of a computer system 800 within which a set of instructions, for causing the machine to perform any one or more of the methodologies discussed herein, can be executed. In some embodiments, the computer system 800 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to erase manager 134 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage system 818, which communicate with each other via a bus 830.

Processing device 802 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein. The computer system 800 can further include a network interface device 808 to communicate over the network 820.

The data storage system 818 can include a machine-readable storage medium 824 (also known as a computer-readable medium, such as a non-transitory computer-readable medium) on which is stored one or more sets of instructions 826 or software embodying any one or more of the methodologies or functions described herein. The instructions 826 can also reside, completely or at least partially, within the main memory 804 and/or within the processing device 802 during execution thereof by the computer system 800, the main memory 804 and the processing device 802 also constituting machine-readable storage media. The machine-readable storage medium 824, data storage system 818, and/or main memory 804 can correspond to the memory sub-system 110 of FIGS. 1A and 1B.

In one embodiment, the instructions 826 include instructions to implement functionality corresponding to erase manager 134 of FIGS. 1A and 1B). While the machine-readable storage medium 824 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory device comprising:
    a memory array comprising a set of memory cells; and
    control logic, operatively coupled with the memory array, to perform operations comprising:
        executing a programming operation to program a memory cell of the set of memory cells to a programming level of a set of programming levels;
        executing, at a first time, a first erase sub-operation of an erase operation to erase the memory cell, the first erase sub-operation including applying, to the memory cell, a first erase pulse having a first erase voltage level to cause the memory cell to have a first threshold voltage level, wherein the first threshold voltage level is based on the programming level of the set of programming levels; and
        executing, at a second time, a second erase sub-operation of the erase operation to erase the memory cell, the second erase sub-operation including applying, to the memory cell, a second erase pulse having a second erase voltage level to cause the memory cell to have a second threshold voltage level, wherein the first erase voltage level of the first erase pulse is lower than the second erase voltage level of the second erase pulse, and wherein the first threshold voltage level is higher than the second threshold voltage level.

2. The memory device of claim 1, wherein the first erase sub-operation is executed in response to a command to erase a memory block comprising the memory cell.

3. The memory device of claim 1, wherein the second erase sub-operation is executed in response to a command to program the memory cell.

4. The memory device of claim 1, wherein the memory cell has a threshold voltage corresponding to the programming level following execution of the programming operation.

5. The memory device of claim 1, wherein the first threshold voltage level is in a range of 0V to 1.0V.

6. The memory device of claim 1, wherein the second threshold voltage level is in a range of −3.0V to −2.0V.

7. The memory device of claim 1, wherein the first erase sub-operation comprises a pre-program operation.

8. The memory device of claim 1, wherein the first erase voltage level is in a range of 12.0V to 16.0V, and wherein the second erase voltage level is in a range of 16.0V to 22.0V.

9. The memory device of claim 1, the operations further comprising executing a further programming operation following execution of the second erase sub-operation.

10. The memory device of claim 1, the operations further comprising executing a garbage collection process following execution of the first erase sub-operation, wherein the garbage collection process identifies the memory cell as in condition for execution of the second erase sub-operation.

11. A method comprising:
    executing, at a first time following a programming operation executed to program a memory cell to a programming level of a set of programming levels, a first erase sub-operation of a multi-stage erase operation to erase the memory cell to a first threshold voltage level, wherein the first threshold voltage level is based on the programming level of the set of programming levels; and
    executing, at a second time, a second erase sub-operation of the multi-stage erase operation to erase the memory cell to a second threshold voltage level that is lower than the first threshold voltage level.

12. The method of claim 11, wherein the first erase sub-operation comprises applying one or more first erase pulses having a first erase voltage level.

13. The method of claim 12, wherein the first erase voltage level is in a range of 12.0V to 16.0V.

14. The method of claim 12, wherein the second erase sub-operation comprises applying one or more second erase pulses having a second erase voltage level that is higher than the first erase voltage level.

15. The method of claim 14, wherein the second erase voltage level is in a range of 16.0V to 22.0V.

16. The method of claim 11, wherein the first threshold voltage level is in a first range of approximately 0V to approximately 1.0V; and wherein the second threshold voltage level is in a second range of −3.0V to −2.0V.

17. A memory device comprising:
    a memory array comprising a plurality of memory cells; and
    control logic, operatively coupled with the memory array, to perform operations comprising:
        executing, at a first time following a programming operation executed to program a memory cell of the plurality of memory cells to a programming level of a set of programming levels, a first erase sub-operation of a multi-stage erase operation to erase the memory cell to a first threshold voltage level, wherein the first threshold voltage level is based on the programming level of the set of programming levels; and executing, at a second time, a second erase sub-operation of the multi-stage erase operation to erase the memory cell to a second threshold voltage level that is lower than the first threshold voltage level.

18. The memory device of claim 17, wherein the first erase sub-operation comprises applying one or more first erase pulses having a first erase voltage level in a range of 12.0V to 16.0V.

19. The memory device of claim 18, wherein the second erase sub-operation comprises applying one or more second erase pulses having a second erase voltage level that is higher than the first erase voltage level.

* * * * *